(12) United States Patent
Platt et al.

(10) Patent No.: US 9,134,944 B1
(45) Date of Patent: Sep. 15, 2015

(54) SYSTEMS, METHODS, AND MEDIUMS FOR SELECTING A PRINTING DEVICE IN A NETWORK

(71) Applicant: Intellectual Ventures Fund 79 LLC, Las Vegas, NV (US)

(72) Inventors: Brian N Platt, Mercer Island, WA (US); Thomas Sachio Kobayashi, Austin, TX (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 0 days.

(21) Appl. No.: 14/085,680

(22) Filed: Nov. 20, 2013

Related U.S. Application Data

(63) Continuation of application No. 12/813,289, filed on Jun. 10, 2010, now abandoned.

(51) Int. Cl.
*G06F 3/12* (2006.01)

(52) U.S. Cl.
CPC ............ *G06F 3/1293* (2013.01); *G06F 3/1296* (2013.01)

(58) Field of Classification Search
None
See application file for complete search history.

(56) References Cited

U.S. PATENT DOCUMENTS

| | | | | |
|---|---|---|---|---|
| 6,348,971 | B2* | 2/2002 | Owa et al. | 358/1.15 |
| 7,424,532 | B1* | 9/2008 | Subbiah | 709/226 |
| 8,482,751 | B2* | 7/2013 | Alverson et al. | 358/1.14 |
| 8,495,202 | B2* | 7/2013 | Kawai | 709/224 |
| 2001/0043357 | A1* | 11/2001 | Owa et al. | 358/1.15 |
| 2004/0004735 | A1* | 1/2004 | Oakeson et al. | 358/1.15 |
| 2009/0216912 | A1* | 8/2009 | Lee et al. | 710/3 |
| 2010/0118337 | A1* | 5/2010 | Kiuchi | 358/1.15 |

* cited by examiner

*Primary Examiner* — Marcus T Riley
(74) *Attorney, Agent, or Firm* — Stolowitz Ford Cowger LLP

(57) ABSTRACT

Examples are generally described that include methods and systems for selecting a printing device from a plurality of printing devices. Some exemplary methods and systems may include receiving a print job from a computing device coupled to the plurality of printing devices via a network. In some examples, the printing device may be selected based on a printing device meeting one or more criteria. In some examples, first identification information also may be received via the network. In addition, second identification may be received from a selected one of the plurality of printing device. In response to identifying a correlation between the first identification information and the second identification information, the stored print job may be provided to the selected one of the plurality of printing devices.

20 Claims, 8 Drawing Sheets

SYSTEMS, METHODS, AND MEDIUMS FOR SELECTING A PRINTING DEVICE IN A NETWORK

RELATED APPLICATIONS

The present claims priority to and is a continuation of pending U.S. patent application Ser. No. 12/813,289, filed Jun. 10, 2010, which we incorporate by reference herein in its entirety.

BACKGROUND

Unless otherwise indicated herein, the materials described in this section are not admitted to be prior art to the claims by inclusion in this section.

A computer network allows computer users to share peripheral devices, such as printers. When printing a document over a computer network, the user identifies which printer to send the print job to and the network receives and sends the print job to the identified printer. In general, this requires the user to identify the printer and to install the printer driver on their computer prior to being able to select the printer. This process may be time consuming, and if the user is not familiar with installing a printer driver on their computer, the user may require assistance from an information technology specialist.

BRIEF DESCRIPTION OF THE DRAWINGS

The foregoing and other features of the present disclosure will become more fully apparent from the following description and appended claims, taken in conjunction with the accompanying drawings. Understanding that these drawings merely depict several examples in accordance with the disclosure, and therefore, are not to be considered limiting of its scope; the disclosure will be described with additional specificity and detail through use of the accompanying drawings.

SUMMARY

Figure 1:
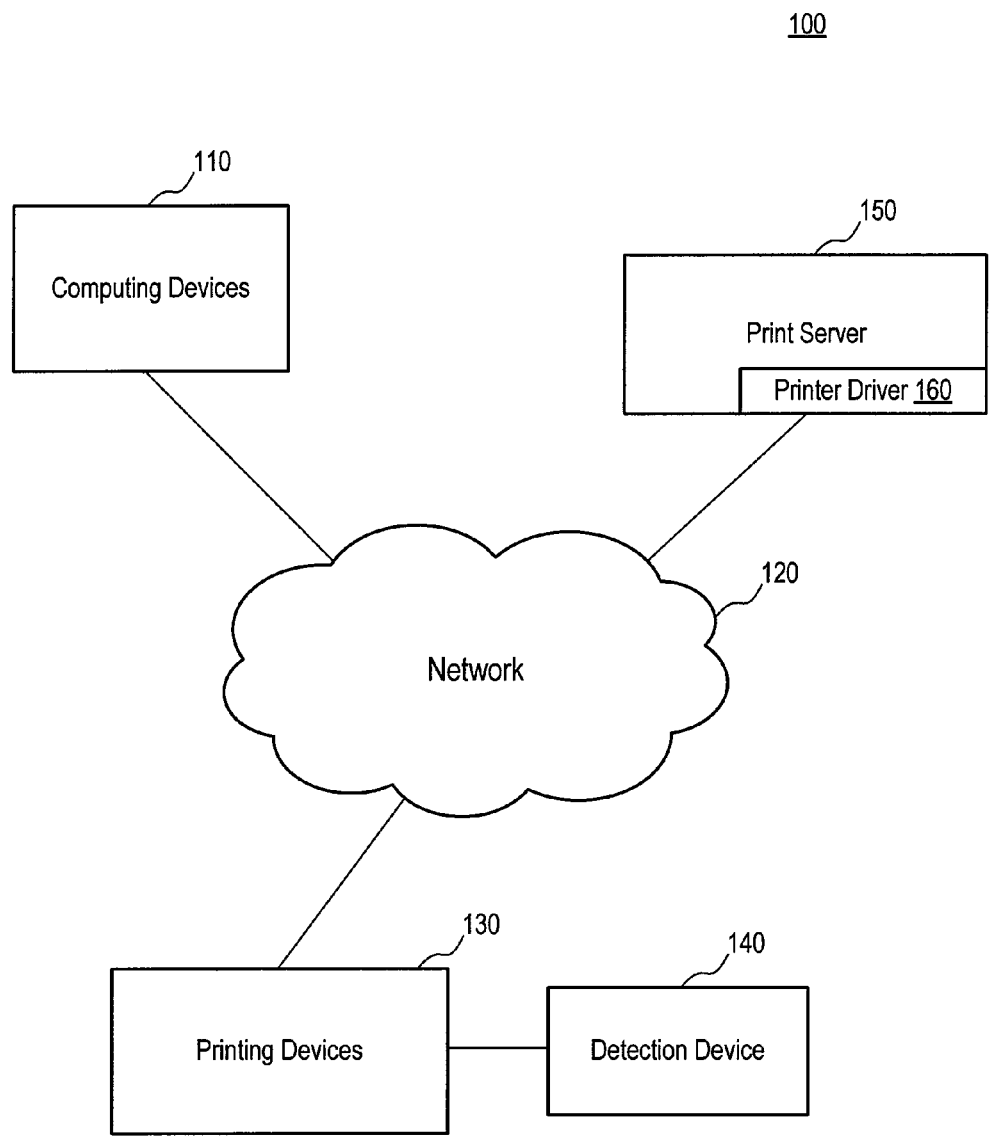
FIG. 1 illustrates a system for selecting a printing device, in accordance with at least some examples of the present disclosure.

The present disclosure describes methods and systems for selecting a printing device in a network environment. Some exemplary methods may include receiving a print job from a computing device via a network. At least one characteristic associated with each of the plurality of printing devices may be compared to at least one criteria associated with the at least one characteristic. The method may further include selecting one of the printing devices based on a result associated with the comparison of the at least one characteristic to the at least one criteria. The print job may be provided to the selected one of the printing devices for printing by the selected one of the printing devices.

Other exemplary methods may include receiving a print job and first identification information from a computing device via a network. The method may further include receiving second identification information from a selected one of the plurality of printing devices. The first identification information may be compared to the second identification information to determine whether there is a correlation. In response to identifying a correlation, the print job may be provided to the selected one of the printing devices.

Some exemplary systems may include a receiver, a selector, and a transmitter. The receiver may be configured to receive a print job associated with a user and electronic identification information indicating a location of an intended recipient of the print job. The selector may be configured to select one of the printing devices to receive the print job based at least on the proximity of the printing device to the location of the intended recipient. The transmitter may be configured to transmit the print job to the selected one of the printing devices for printing by the selected one of the printing devices. In other exemplary systems, the receiver may be configured to receive a print job from a computing device coupled to the plurality of printing devices via a network. In some systems the print job is received without receiving a selection of one of the printing devices for printing the print job. The selector may be configured to select one of the printing devices to print the print job based on the printing device satisfying at least one criteria. The transmitter may be configured to transmit the print job to the selected one of the printing devices for printing by the selected one of the printing devices.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not intended to be limiting. Other examples may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are implicitly contemplated herein.

This disclosure is drawn, inter alia, to methods, systems, devices, apparatus, and/or mediums generally related to printing print jobs. Some example devices may include methods and systems for selecting a printing device from a plurality of printing devices. Some exemplary methods and systems may include receiving a print job from a computing device coupled to the plurality of printing device via a network. In some examples, the printing device may be selected based on a printing device meeting one or more criteria. In some examples, first identification information may also be received via the network. In addition, second identification may be received from a selected one of the plurality of printing device. In response to identifying a correlation between the first identification information and the second identification information, the stored print job may be provided to the selected one of the plurality of printing devices.

FIG. 1 illustrates a system 100 for selecting a printing device from a plurality of printing devices, in accordance with at least some examples of the present disclosure. System 100 may include one or more computing devices 110, one or more printing devices 130, and a print server 150 coupled to each other via a network 120. For instance, computing devices 110 and printing devices 130 may be coupled to print server 150 via network 120. In some examples, printing device 130 may be coupled to a detection device 140. In other examples, printing device 130 may comprise detection device 140. Computing device 110 may be any device configured to transmit digital signals, such as a print job, to print server 150 via network 120. For instance, computing device 110 may be a laptop computer, a desktop computer, a wireless phone, a global positioning system, or any other device capable of transmitting digital signals.

Network 120 may be any environment configured to receive and to transmit signals, e.g., signals related to a print job. In some examples, the network may be a wide area network (WAN), a local area network (LAN), a campus area network (CAN), a metropolitan area network, a personal area network (PAN), or the like. Computing device 110 may be wirelessly coupled to network 120 or wired. In some examples, network 120 may comprise two or more networks. For example, computing device 110 may be coupled to print server 150 via a private network and print server 150 coupled to printing devices 130 via a public network, such as the internet.

Print server 150 may be configured to receive and to store print jobs received from one or more computing devices 110 via network 120. Upon receiving a print job, print server 150 may be configured to identify and to select a printing device 130 for printing the print job. Print server 150 may identify and select printing device 130, e.g., automatically may identify and select printing device 130, based on printing device 130 having at least one characteristic associated therewith that satisfies one or more criteria, e.g., criteria selected by a user of computing device 110, associated with the at least one characteristic. For example, print server 150 may identify printing device 130 based on the proximity of printing device 130 the computing device 110 that provided the print job, to a predetermined location, or to an identified receiver, e.g., intended recipient, of the print job. In another example, print server 150 may identify printing device 130 based on whether printing device 130 is available or has an amount of consumables associated therewith that is greater than a particular, e.g., predetermined, amount of consumables. Consumables may include printing device 130 consumables, such as paper, ink, or the like. In yet another example, print server 150 may identify printing device 130 based on a user's or a print job receiver's permission to use a particular printing device 130. Upon identifying and selecting a printing device 130, print server 150 may provide the print job to the identified printing device 130 In this manner, print server 150 may be configured to identify and select one of printing devices 130 without a user of computing device 110 having to select one of printing devices 130 and without receiving a selection of one of printing devices 130 for printing the print job. In some examples, the identified printing device 130 may be configured to receive a fee for printing the print job before the print job is executed by the print device 130.

In some examples, print server 150 may provide computing device 150 with the location of the identified printing device 130. For instance, print server 150 may transmit a message to computing device 150 via network 120. The message may be configured to communicate the location of the printing device 150 to which the print job has been or will be sent. In some examples, the message may request confirmation that the identified printing device 130 is acceptable. In other examples, the message may include a map indicating a location of available printing devices 130 or a location of the identified printing device 130, or both. The user may be able to select a printing device 130 or change the identified printing device 130 to another available printing device 130. In some examples, the message includes the user's location relative to the available printing devices 130. In yet another example, a printing device 130 may be identified based on a location and an expected or observed direction of travel of computing device 110. In this example, computing device 110 may comprise a global position system (GPS) configured to identify a location of computing device 110 and to correlate the location of computing device 110 relative to one or more of the plurality of printing devices 130.

In some examples, the user may wish to send the print job to print server 150 and later select the printing device 130 that will print the print job, or the user may wish to send the print job to print server 150 and have an intended recipient of the print job different than the user select the printing device 130 that will print the print job. In these examples, a user may include first identification information, e.g., user identification information, with the print job. The first identification information may comprise an internet protocol (IP) address, a telephone number, an email address identifying the user assigned to computing device 110, a login name associated with computing device 110, a password associated with computing device 110, or the like, or any combination thereof. Print server 150 may receive and store both the first identification information and the print job. The user or the intended recipient of the print job then may identify a printing device 130 to print the job. For example, the user or the intended recipient may enter second identification information in detection device 140, and printing device 130 may transmit the second identification information to print server 150. The second identification information may be provided using a radio frequency identification (RFID) tag, an entry keycard, a personal identification number (PIN), login information, a password, or the like, or any combination thereof. In an example in which the user enters the second identification information, the second identification information may be the same as the first identification information, and in an example in which the intended recipient that is not the user enters the second identification information, the second identification information may be different than the first identification information.

Print server 150 may include structure that is configured to compare the second identification information received from printing device 130 to the first identification information received with the print job to identify a correlation, e.g., a match or an association, therebetween. For instance, print server 150 may include a comparator 240. Upon comparator 240 identifying a correlation between the first identification information and the second identification information, the corresponding print job may be provided from print server 150 to printing device 130. In some examples, detection device 140 may receive the second identification information from the user or the intended recipient manually entering the second identification information. In this example, the user may send the print job to print server 150 without selecting a printing device 130, and the user or the intended recipient subsequently may select printing device 130 by physically locating printing device 130 and manually entering the second identification information. In other examples, detection device 140 may receive the second identification information wirelessly, such as via a radio frequency identification tag, a keycard, or any other wireless device. When the intended recipient of the print job is different than the user of computing device 110, the user of computing device 110 may have pre-registered with print server 150, and print server 150 may be configured to determine an association between the first identification information and the second identification information, and to provide the print job to printing device 130 after identifying the association therebetween. In some examples, print server 150 may be configured to access a look up table (LUT) to confirm that at least one of the first identification information or the second identification information has access to print on the identified printing device 130.

In another example, print server 150 may provide the corresponding print job to a plurality of printing devices, including printing device 130, and withhold authorization to print the corresponding print job from printing device 130. When comparator 240 identifies a correlation between first identification information and second identification information, print server 150 will only then provide authorization to print the corresponding print job to printing device 130.

In one example, print server 150 may be configured to convert data in the print job to a universal format, such as a portable document format (PDF), a postscript format, or any other format accepted by printing devices. In another example, print server 150 may comprise a printer driver 160 for one or more printing devices 130. For instance, print server 150 may include a printer driver 160 for each printing device 130 coupled to print server 150 via network 120. Printer driver 160 may be configured to convert data from the received print job to a format specific for the identified printing device 130 before providing the print job to the identified printing device 130. In some examples, print server 150 may be configured to detect the format of the print job, and if desired, convert the print job to another format.

Figure 2:
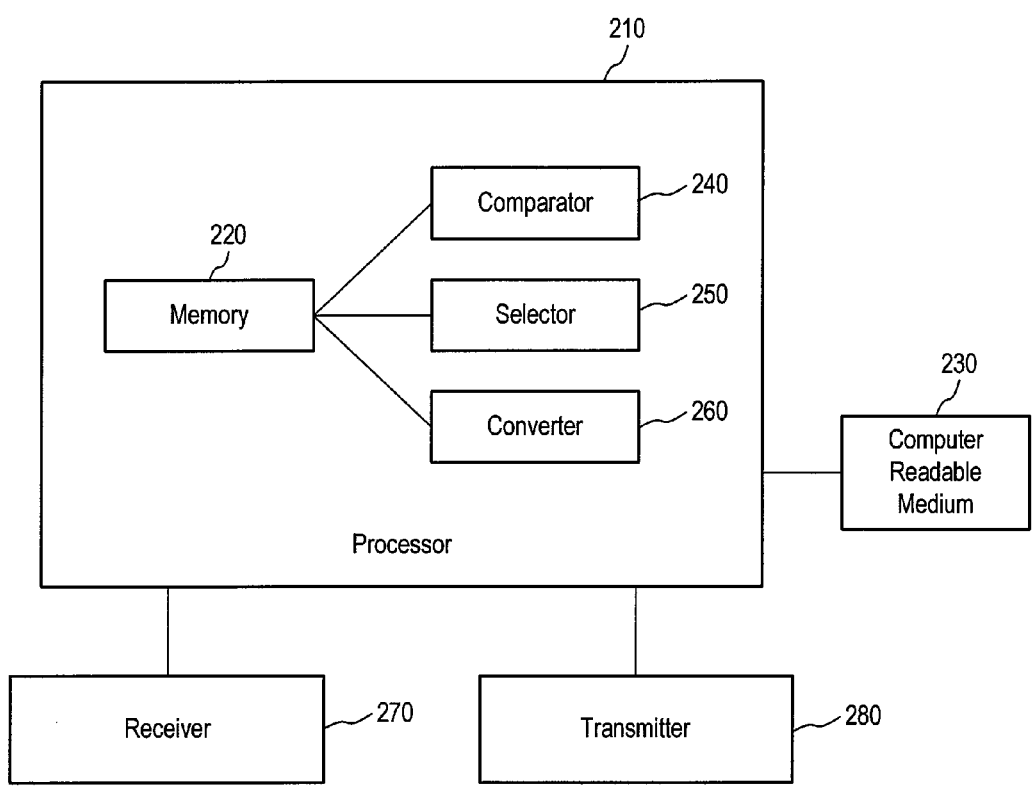
FIG. 2 is a block diagram illustrating a system, in accordance with at least some examples of the present disclosure.

FIG. 2 is a block diagram illustrating a system 200, in accordance with at least some examples of the present disclosure. System 200 may include a processor 210 and a memory 220. Memory 220 may store program instructions that upon being executed by processor 210, cause processor 210 to select a printing device from a plurality of printing devices, e.g., printing devices 130. In another example, a computer-readable medium 230 may store program instructions that upon execution by an apparatus, such as processor 210, may cause the apparatus to select a printing device from the plurality of printing devices, as described below. In some examples, processor 210 may include structure or capabilities for comparing, selecting, and converting, such as is illustrated by comparator 240, a selector 250, and a converter 260, respectively. Processor 210 also may include or be coupled to a receiver 270 and a transmitter 280 for receiving and transmitting signals, respectively. For instance, receiver 270 may be configured to receive the print job from computing device 110 of FIG. 1, and transmitter 280 may be configured to provide the print job to one of printing devices 130. Moreover, memory 220 may be configured to store the print job.

Figure 3:
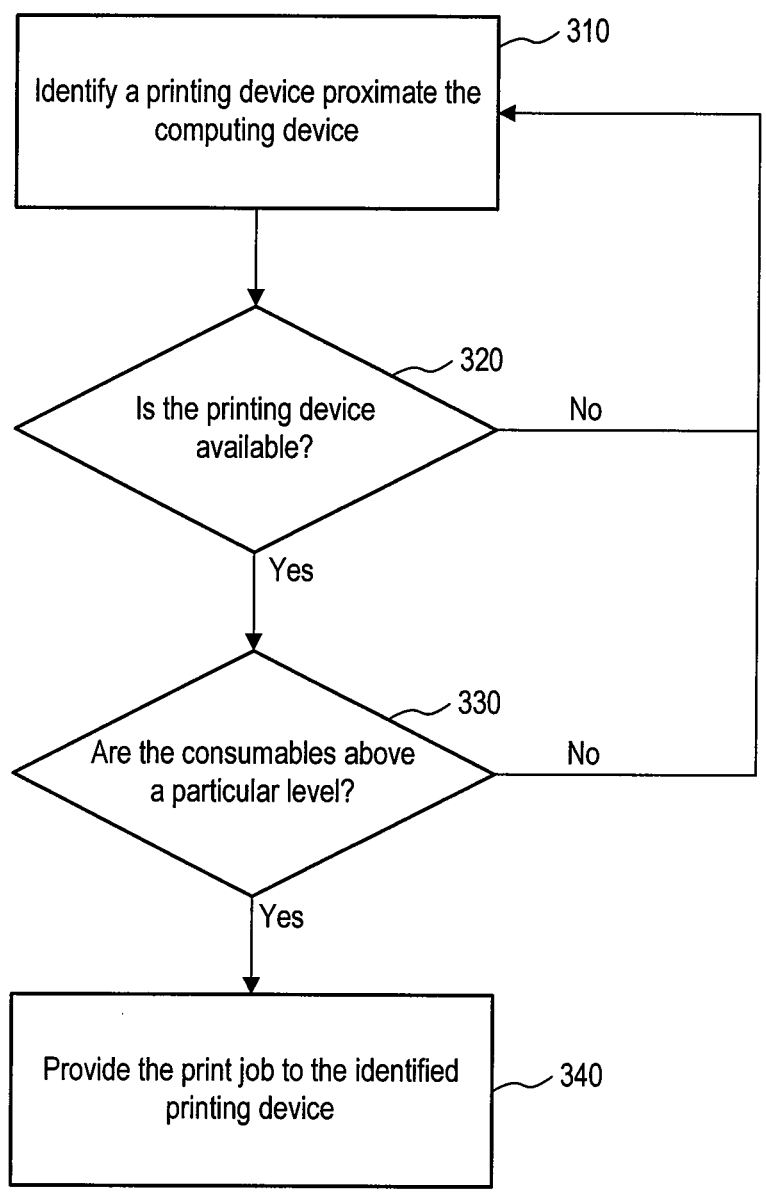
FIG. 3 is a flow chart illustrating an exemplary method, in accordance with at least some examples of the present disclosure.

FIG. 3 is a flow chart illustrating an exemplary method 300, in accordance with at least some examples of the present disclosure. Method 300 may include one or more functions, operations, or actions, as illustrated by blocks 310-340 for identifying a printing device to which to provide a print job received from a computing device. Method 300 may begin at block 310. In block 310, a printing device may be identified, e.g., a printing device may be identified based on proximity of the printing device. Block 310 may be followed by block 320. At block 320, the availability of the identified printing device may be determined. If the identified printing device is not available, e.g., the identified printing device is assigned to a group of users that does not include the requesting user, a status identifier indicates that the identified printing device requires servicing, or the like, then block 320 may be followed by block 310, as is illustrated by the "NO" decision branch. In block 310, another computing device may be identified. If, however, the identified printing device is available, then block 320 may be followed by block 330, as is illustrated by the "YES" decision branch. In block 330, at least one consumable of the identified printing device may be compared to a particular threshold. Consumables may include paper, ink, or any other consumable that may be associated with a printing device. If the at least one consumable is below the particular threshold, then block 330 may be followed by block 310 as is illustrated by the "NO" decision branch. In block 310, another computing device may be identified. If, however, the at least one consumable is above the particular threshold, then block 330 may be followed by block 340, as is illustrated by the "YES" decision branch. In block 340, the print job may be provided to the identified printing device for printing by the identified printing device.

Figure 4:
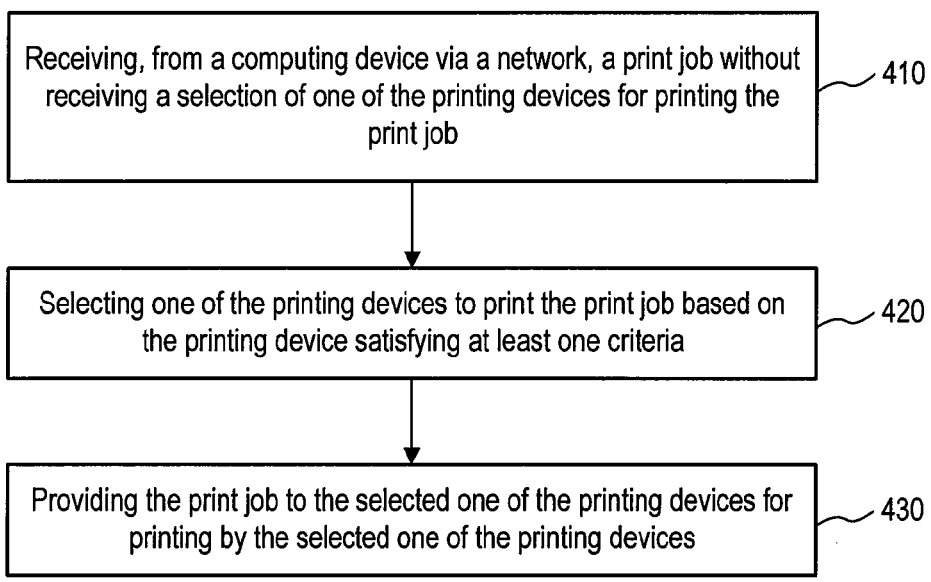
FIG. 4 is a flow chart illustrating another exemplary method, in accordance with at least some examples of the present disclosure.

FIG. 4 is a flow chart illustrating an exemplary method 400, in accordance with at least some examples of the present disclosure. Method 400 may include one or more functions, operations, or actions, as illustrated by blocks 410-430, for selecting a printing device from a plurality of printing devices. Method 400 may begin at block 410. In block 410, a print job may be received from a computing device coupled to the plurality of printing devices via a network. The print job may be received without instructions specifying a printing device to print the print job. Block 410 may be followed by block 420. In block 420, one of the printing devices may be selected to print the print job based on the printing device satisfying at least one criteria. Block 420 may be followed by block 430. In block 430, the print job may be provided to the selected one of the printing devices for printing by the selected one of the printing devices.

Figure 5:
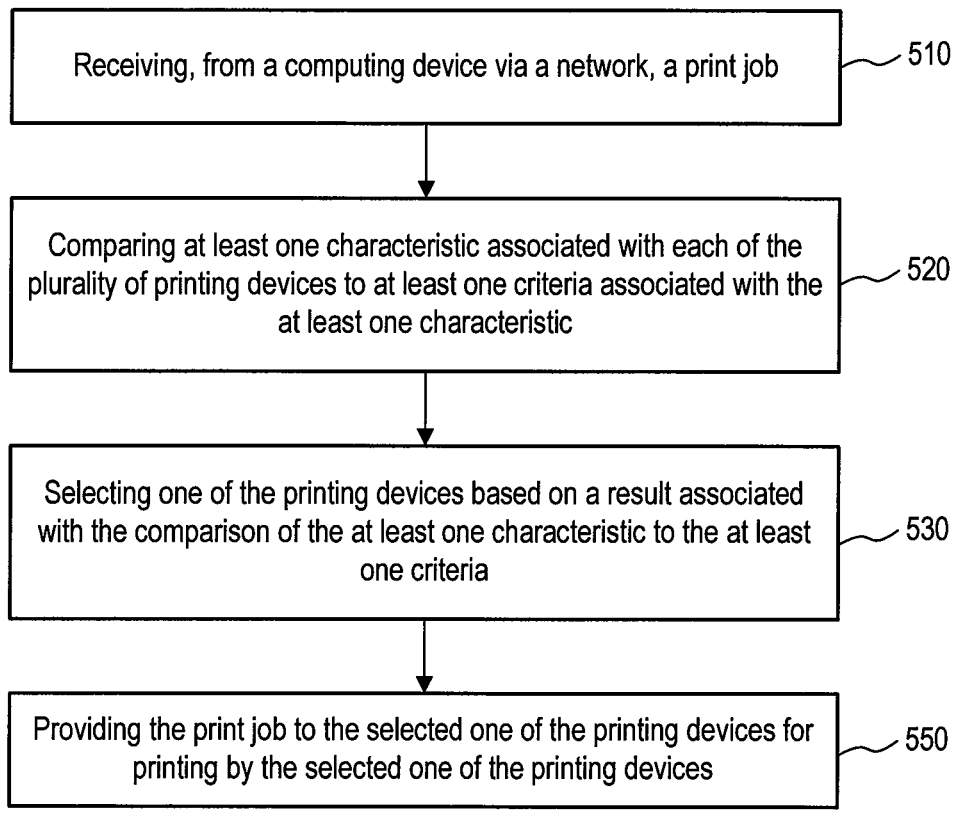
FIG. 5 is a flow chart illustrating yet another exemplary method, in accordance with at least some examples of the present disclosure.

FIG. 5 is a flow chart illustrating yet another exemplary method 500, in accordance with at least some examples of the present disclosure. Method 500 may include one or more functions, operations, or actions, as illustrated by blocks 510-530, for selecting a printing device from a plurality of printing devices. Method 500 may begin at block 510. In block 510, a print job may be received from a computing device coupled to the plurality of printing devices via a network. Block 510 may be followed by block 520. In block 520, at least one characteristic associated with each of the plurality of printing devices may be compared to at least one criteria associated with the at least one characteristic. Block 520 may be followed by block 530. In block 530, one of the printing devices may be selected based on a result associated with the comparison of the at least one characteristic to the at least one criteria. Block 530 may be followed by block 540. In block 540, the print job may be provided to the selected one of the printing device for printing by the selected one of the printing devices.

Figure 6:
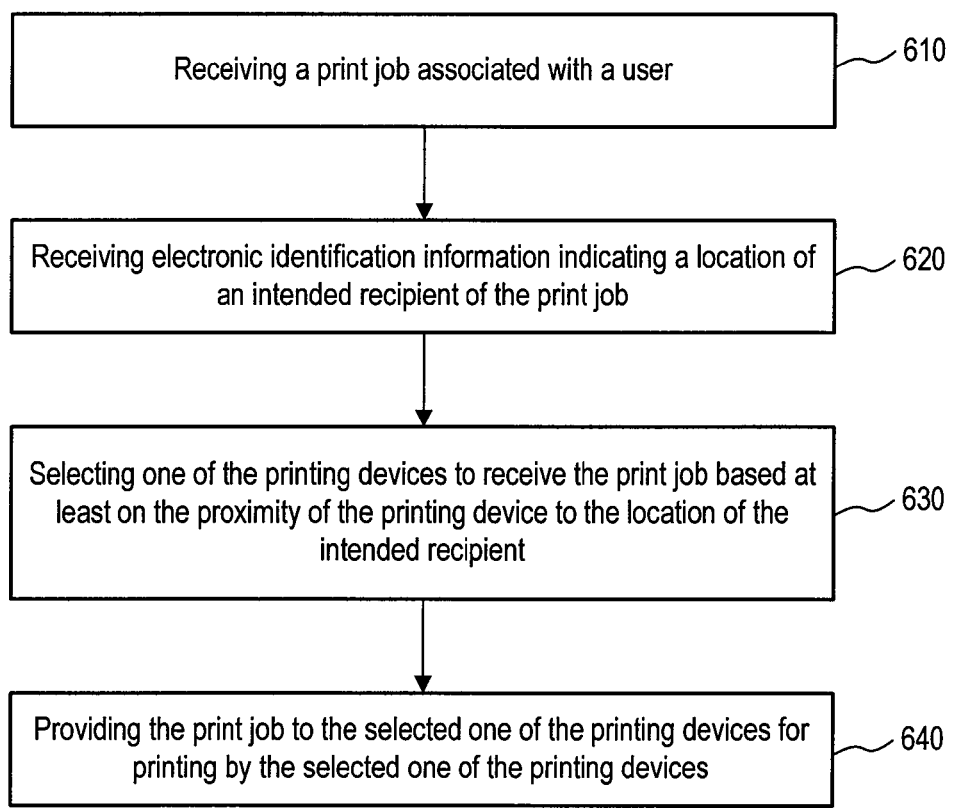
FIG. 6 is a flow chart illustrating still another exemplary method, in accordance with at least some examples of the present disclosure.

FIG. 6 is a flow chart illustrating yet another exemplary method 600, in accordance with at least some examples of the present disclosure. Method 600 may include one or more functions, operations, or actions, as illustrated by blocks 610-630, for selecting a printing device from a plurality of printing devices. Method 600 may begin at block 610. In block 610, a print job associated with a user may be received. Block 610 may be followed by block 620. In block 620, electronic identification information indicating a location of an intended recipient of the print job may be received. Block 620 may be followed by block 630. In block 630, one of the printing devices to receive the print job may be selected to receive the print job based at least on the proximity of the printing device to the location of the intended recipient. Block 630 may be followed by block 640. In block 640, the print job may be provided to the selected one of the printing device for printing by the selected one of the printing devices.

Figure 7:
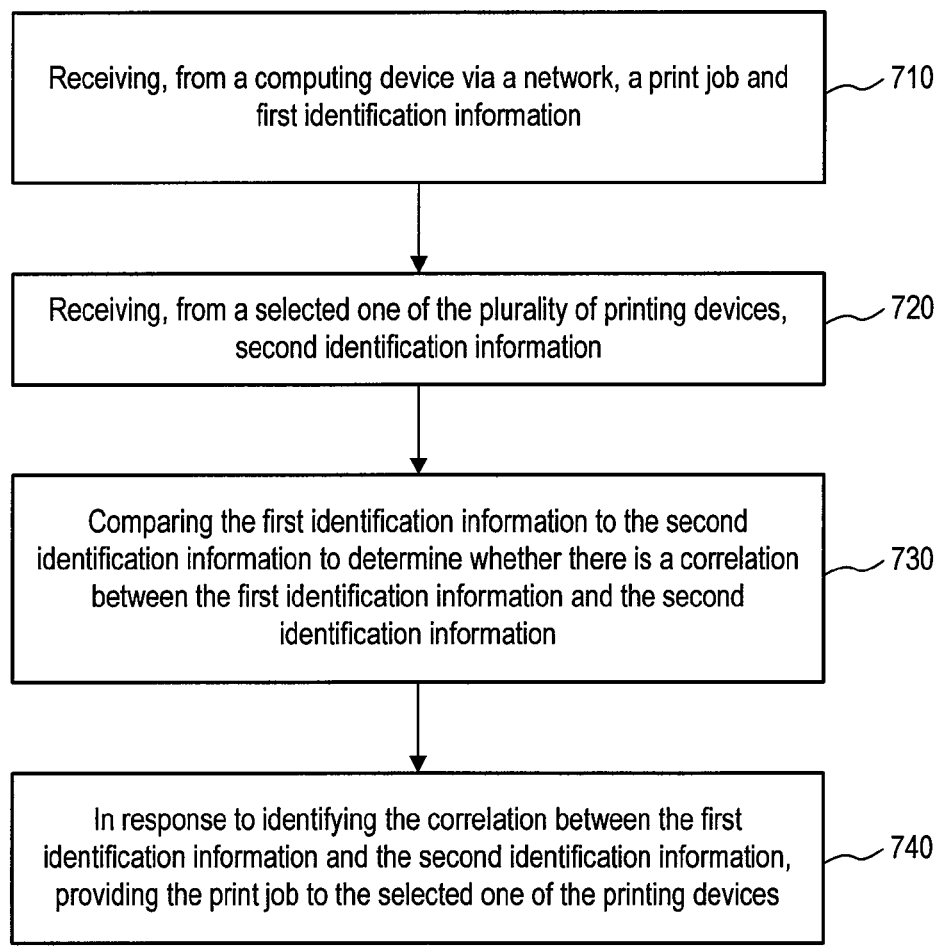
FIG. 7 is a flow chart illustrating still yet another exemplary method, in accordance with at least some examples of the present disclosure.

FIG. 7 is a flow chart illustrating yet another exemplary method 700, in accordance with at least some examples of the present disclosure. Method 700 may include one or more functions, operations, or actions, as illustrated by blocks 710-750 for selecting a printing device from a plurality of printing devices. Method 700 may begin at block 710. In block 710, a print job and first identification information may be received from a computing device. In some example methods, the print job and the first identification information are received without receiving instructions identifying a printing device to print the print job.

Block 710 may be followed by block 720. In block 720, second identification information may be received from a selected one of the plurality of printing devices. The second identification information may be provided using a radio frequency identification (RFID) tag, an entry keycard, a personal identification number (PIN), login information, a password, or the like, or any combination thereof. Block 720 may be followed by block 730. In block 730, the second identification information received from the printing device may be compared to the first identification information received from the computing device to determine whether there is a correlation, e.g., an association or a match therebetween. In some examples, first identification information may be identical to second identification information. If there is a correlation therebetween, block 730 may be followed by block 740. In block 740, the stored print job may be provided to the selected one of the printing devices.

Figure 8:
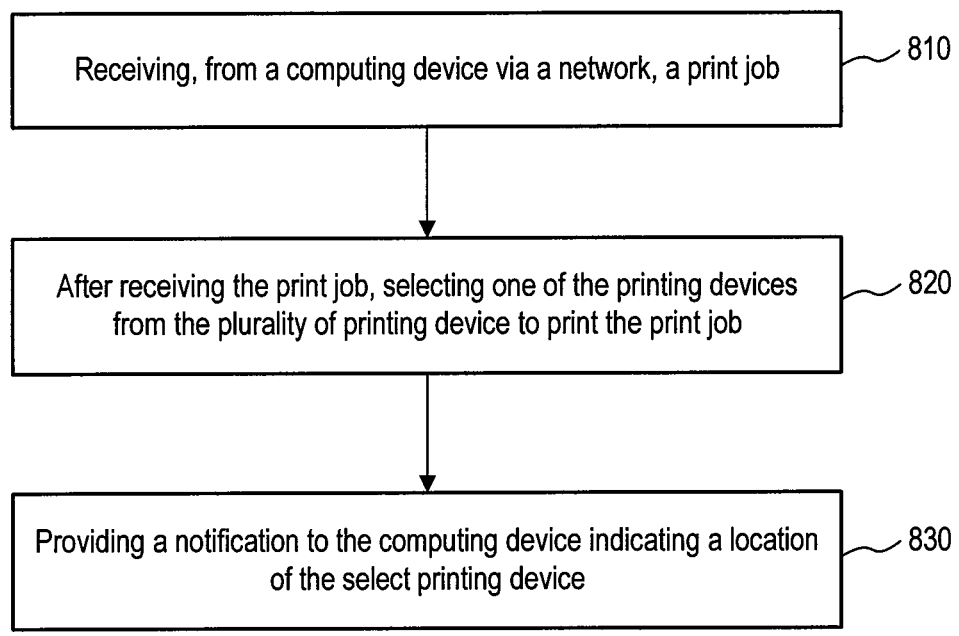
FIG. 8 is a flow chart illustrating still yet another exemplary method, in accordance with at least some examples of the present disclosure.

FIG. 8 is a flow chart illustrating yet another exemplary method, in accordance with at least some examples of the present disclosure. Method 800 may include one or more functions, operations, or actions, as illustrated by blocks 810-830 for selecting a printing device from a plurality of printing devices. Method 800 may begin at block 810. In block 810, a print job may be received from a computing device via a network. Block 810 may be followed by block 820. In block 820, after receiving the print job, one of the printing devices may be selected from the plurality of printing devices to print the print job. Block 820 may be followed by block 830. In block 830 a notification may be provided to the computing device indicating a location of the selected printing device.

The various blocks described herein for methods 300, 400, 500, 600, 700, and 800 may be performed sequentially, in parallel, or in a different order than those described herein. It also should be appreciated that in some implementations one or more of the illustrated blocks may be eliminated, combined, or separated into additional blocks. The described and illustrated methods 300, 400, 500, 600, 700, and 800 also may include various additional blocks not shown. For instance, in method 400, the amount of the at least one consumable associated with the identified printer may be determined before determining whether the identified printer is available.

While various examples have been disclosed herein, other examples will be apparent to those skilled in the art. The various examples disclosed herein are for purposes of illustration and are not intended to be limiting, with the true scope and spirit being indicated by the following claims.

The invention claimed is:

1. A method, comprising:
   receiving, from a computing device via a network, a print job comprising a first identification;
   storing the print job and the first identification in a memory device;
   receiving, from a selected printing device via the network, a second identification;
   identifying a correlation between the first identification and the second identification;
   transmitting, to the computing device via the network, a map indicating a location of available printing devices or a location of the selected printing device;
   automatically selecting the selected printing device based at least in part on the correlation indicating that the second identification has at least one characteristic that satisfies at least one criteria associated with the first identification; and
   providing the print job to the selected printing device for printing based at least in part on the automatically selecting the selected printing device;
   wherein the first identification comprises an internet protocol address, a telephone number, an email address, a sender or recipient login information, a sender or recipient password, or any combination thereof; and
   wherein the second identification comprises a radio frequency identification (RFID) tag, an entry keycard, a personal identification number, the sender or recipient login information, the sender or recipient password, or any combination thereof.

2. The method of claim 1, further comprising:
   converting the print job from a first format to a second format after receiving the print job from the computing device; and
   storing the converted print job.

3. The method of claim 2, wherein the second format is a universal format.

4. The method of claim 1, wherein the computing device is coupled to a plurality of printing devices via the network.

5. The method of claim 1, further comprising providing notification to the computing device that the print job was provided to the printing device.

6. The method of claim 5, wherein the notification comprises an indication of a location of the printing device with respect to the computing device.

7. The method of claim 1, wherein providing the print job to the printing device comprises:
   providing notification of the providing to the computing device;
   requesting acceptance of the printing device from the computing device; and
   providing the print job to the printing device in response to receiving the acceptance from the computing device.

8. The method of claim 1, wherein receiving the print job further comprises receiving the print job without receiving a selection of one of the printing devices for printing the print job.

9. A system, comprising:
   a receiver configured to:
      receive a print job comprising a first identification from a computing device via a network; and receive a second identification from a selected printing device via the network;
a comparator configured to identify a correlation between the first identification and the second identification;
a selector configured to automatically select the selected printing device based at least in part on the correlation indicating that the second identification has at least one characteristic that satisfies at least one criteria associated with the first identification; and
a transmitter configured to:
transmit the print job to the selected printing device based at least in part on the selector automatically selecting the selected printing device; and
transmit to the computing device via the network a map indicating a location of available printing devices or a location of the selected printing device;
wherein the first identification comprises an internet protocol address, a telephone number, an email address, a sender or recipient login information, a sender or recipient password, or any combination thereof; and
wherein the second identification comprises a radio frequency identification (RFID) tag, an entry keycard, a personal identification number, the sender or recipient login information, the sender or recipient password, or any combination thereof.

10. The system of claim 9, further comprising a memory configured to store the print job after the receiver receives the print job from the computing device.

11. The system of claim 9, further comprising:
a converter configured to convert the print job from a first format to a second format after the receiver receives the print job from the computing device; and
a memory configured to store the converted print job.

12. The system of claim 11, wherein the second format is a universal format.

13. The system of claim 9, wherein the computing device is coupled to a plurality of printing devices via the network.

14. A non-transitory computer readable medium having stored thereon executable instructions that, in response to execution by a processing device, cause the processing device to perform operations comprising:
receiving, from a computing device via a network, a print job comprising a first identification;
receiving, from a selected printing device via the network, a second identification;
comparing the first identification to the second identification to find a correlation;
transmitting, to the computing device via the network, a map indicating a location of available printing devices or a location of the selected printing device;
automatically selecting the selected printing device based at least in part on the correlation indicating that the second identification has at least one characteristic that satisfies at least one criteria associated with the first identification; and
providing the print job to the selected printing device based at least in part on the automatically selecting the selected printing device;
wherein the first identification comprises an internet protocol address, a telephone number, an email address, a sender or recipient login information, a sender or recipient password, or any combination thereof; and
wherein the second identification comprises a radio frequency identification (RFID) tag, an entry keycard, a personal identification number, the sender or recipient login information, the sender or recipient password, or any combination thereof.

15. A method, comprising:
receiving, from a computing device via a network, a print job and a first identification;
receiving, from a selected printing device of a plurality of printing devices coupled to the network, a second identification;
comparing the first identification to the second identification to determine a correlation between the first identification and the second identification;
transmitting, to the computing device via the network, a map indicating a location of available printing devices or a location of the selected printing device;
automatically selecting the selected printing device based at least in part on the correlation indicating that the second identification has at least one characteristic that satisfies at least one criteria associated with the first identification; and
in response to automatically selecting the selected printing device, providing the print job to the selected printing device;
wherein the first identification identifies a user of the computing device; and
wherein the second identification information identifies a user of the selected printing device.

16. The method of claim 15, wherein the correlation comprises the first identification being associated with the second identification.

17. The method of claim 15,
wherein the first identification is different from the second identification.

18. The method of claim 15, wherein the correlation comprises the first identification being similar to the second identification.

19. The method of claim 15, wherein the first identification and the second identification are configured to identify a user of the computing device.

20. The method of claim 15, further comprising:
converting the print job from a first format to a second format after receiving the print job from the computing device; and
storing the converted print job.

* * * * *